United States Patent [19]

Kramer

[11] Patent Number: 5,183,350
[45] Date of Patent: Feb. 2, 1993

[54] ADJUSTABLE FIXED MOUNT FOR A HOLOGON DEFLECTOR

[75] Inventor: Charles J. Kramer, Rochester, N.Y.

[73] Assignee: Holotek Ltd., Rochester, N.Y.

[21] Appl. No.: 806,619

[22] Filed: Dec. 12, 1991

[51] Int. Cl.⁵ .............................................. F16D 1/12
[52] U.S. Cl. .................................... 403/4; 403/258;
    403/259; 74/479; 51/168; 359/198; 359/819
[58] Field of Search ................... 403/4, 260, 261, 258,
    403/76, 90, 57, 59; 359/17, 18, 198-200, 819,
    827; 51/168-169; 74/479, 841

[56] References Cited

U.S. PATENT DOCUMENTS

| 1,672,573 | 6/1928 | Maynard | 51/168 |
| 4,067,639 | 1/1978 | Kramer | 350/6 |
| 4,147,401 | 4/1979 | Reichl et al. | 359/198 X |
| 4,227,826 | 10/1980 | Conrad | 403/90 X |
| 4,239,326 | 12/1980 | Kramer | 350/3.71 |
| 4,243,293 | 1/1981 | Kramer | 350/3.71 |
| 4,299,529 | 11/1981 | Inaba et al. | 901/29 X |
| 4,321,772 | 3/1982 | Ziegel | 51/168 X |
| 4,353,615 | 10/1982 | Kramer et al. | 350/3.71 |
| 4,610,500 | 9/1986 | Kramer | 350/3.71 |
| 4,756,586 | 7/1988 | Witteveen | 359/198 X |
| 5,048,237 | 9/1991 | Lankry | 51/168 |

FOREIGN PATENT DOCUMENTS 243902 11/1987 European Pat. Off. .............. 359/18

Primary Examiner—Randolph A. Reese
Assistant Examiner—Harry C. Kim

[57] ABSTRACT

An adjustable, resettable fixed mount for a hologon laser scanner disc or spinner provides perpendicular angular orientation of the hologon disc relative to the motor rotation axis within about 5 to 10 arc seconds and corresponding wobble angles as compared to 20 to 40 arc seconds for hologon discs mounts in dynamic mounts or rigidly with fixed, hard mounts which have heretofore been proposed and used. The improved mount is a fixed hard mount which is nevertheless adjustable. It may be implemented by a connecting assembly having a hub with a spherical bearing which allows perpendicular angular orientation of the hologon about a plane perpendicular to the motor drive shaft on which the spherical bearing is mounted. A retainer cap has a plurality of angularly spaced adjusting screw members which change the perpendicular angular orientation of the disc relative to the motor rotation axis. Alignment is performed while the hologon is not rotating. The adjusting screws from the retainer cap have tips which are inserted into the hologon disc assembly and preferably a balancing disc of soft metal which is opposed to and spaced from the retainer cap. Then the rotational angular position of the hologon is locked to the rotational position of the retainer cap which in turn is locked to the motor shaft. The improved mount maintains the hologon alignment position even after many hours of use and starts and stops of the motor rotation. Readjustment may readily be accomplished by resetting the adjusting screws.

10 Claims, 5 Drawing Sheets

ADJUSTABLE FIXED MOUNT FOR A HOLOGON DEFLECTOR

FIELD OF THE INVENTION

The present invention relates to hologon (holographic beam deflector) scanner apparatus, and particularly to an improved mount for a hologon disc unit (sometimes called a spinner) which maintains alignment of the hologon disc with the motor shaft and may readily be realigned.

A hologon mount in accordance with the invention is especially suitable for use in a hologon laser scanner for printing, phototypesetting, and other applications where precision scanning of the laser beam is a requirement.

BACKGROUND

It has long been accepted that minimizing deflector wobble is a necessary requirement for hologon laser scanners. Both dynamic and fixed mounts have been proposed. A fixed mount is shown in FIG. 1 and is also shown in U.S. Pat. No. 4,610,500 issued Sep. 9, 1986 to Charles J. Kramer. A dynamic mount is shown in FIG. 2. Dynamic mounts are described in U.S. Pat. No. 4,067,639 issued Jan. 10, 1978 to Charles J. Kramer and 4,353,615 issued Oct. 12, 1982 to Charles J. Kramer, et al. The effect of deflector wobble and the desirability of minimizing the deflector wobble angle is discussed in U.S. Pat. No., 4,239,326 issued Dec. 16, 1980 to Charles J. Kramer.

In the rigid mount shown in FIG. 1, a precision surface is machined on the top of an annular ring 10 projecting from a rigid mounting hub 12 which may be pressed fit to the shaft 14 of the motor 16. The hub has a length along the motor shaft that is about twice the shaft diameter and is made of the same stainless steel material as the motor shaft. The hologon disc unit wherein the grating facets are contained between glass plates 18, is tightly held against the precision machined hub surface of the ring 10 by a spring washer assembly 20 including a spring washer 22, a thrust ring 24, an O-ring 26 and a locking screw 28. A retainer 29 has a cylindrical post 30 from which a disc shaped flange 32 extends. A hub 33 at the center of the disc, which is part of the hologon disc unit 34, receives the motor shaft 14 and the post 30. The locking assembly fixes the rotational angular position of the disc unit 34, and the perpendicular angular orientation of the disc relative to the motor rotation axis 36 is determined by the accuracy of the rigid mounting hub 12, its precision surface of the ring 10 and the locking assembly 20. Such fixed, hard mounts as are shown in FIG. 1 have achieved deflector wobble angles from 20 to 40 arc seconds.

FIG. 2 illustrates a dynamic mount that employs a spherical bearing 40 which is keyed by a drive pin to the motor shaft 42. The hologon disc unit 44 (provided by the hologon grating in an air gap 46) between the glass cover discs (a substrate disc 48 and a cover disc 50) has a center which is fixedly connected to a raceway 52. The spherical curvature of the inner periphery of the raceway permits the disc to rotate freely about the center of the bearing 40 in any direction. The angular drive to the hologon unit 44 is obtained by the drive pin 54 which is disposed in a slot 56 in the raceway 52. The hologon unit can pivot freely in a direction about a plane perpendicular to the rotational axis of the shaft 42 in the direction indicated by the double-headed arrow 58 labeled "Gimbal Motion". The dynamic mount allows the deflector to approach a position with the disc unit 44 perpendicular to the rotational axis of the shaft 42. The centrifugal force which is developed as the disc rotates to bring it to the perpendicular position decreases as the disc unit 44 approaches perpendicular position so that the perpendicular position is approached asymptotically without ever actually reaching it. Typical performance for a dynamic mount such as shown in FIG. 2 is 20 to 40 arc seconds of fixed deflector wobble angle.

Both the dynamic mount of FIG. 2 and the fixed, rigid mount of FIG. 1, as well as variations thereof such as described in the above-referenced patents, have many problems associated therewith and do not achieve as low a disc wobble as desired, thus limiting hologon scanner apparatus to certain orientations in order to make them more insensitive to mechanical wobble. Such arrangements are shown, for example, in U.S. Pat. No. 4,243,293 issued Jan. 6, 1981 to Charles J. Kramer. It is a feature of this invention to provide greater flexibility and freedom of design of hologon laser scanner apparatus by reducing mechanical wobble.

The dynamic mounts provide best performance at high speeds of rotation (e.g. 12,000 rpm), since at low speeds the forces which provide the alignment of the disc to the rotational axis of the shaft are reduced. The fixed mount of FIG. 1 is fairly heavy, particularly because of the size of the hub which, while preventing movement makes the hub assembly heavy which limits the rotational speed of the hologon/motor assembly and makes it difficult to repair the ball bearings in the motor when they wear out.

In the dynamic mount, improper operation usually occurs as a result of the desire to minimize any radial play in the spherical bearing which would contribute to balancing problems. Radial play in the spherical bearing is minimized by having the bearing have a tight fit between the inner bearing member (the spherical bearing 40) and the outer bearing raceway 52. This tight fit increases the friction between the bearing surfaces and causes the bearing to stick at given positions. A lubricating film, such as Teflon has been used, but with such a film the bearing sometimes sticks as the hologon disc approaches the self-alignment position, since the alignment forces decrease asymptotically as the disc aligns itself.

Bearing sticking is exacerbated when the hologon unit must be run at both high and low rotation speeds because the fit between the bearing members is adjusted for balancing at the high rotation speed, which usually produces an internal bearing friction which is large relative to the lower alignment forces that are present at the lower rotation speeds. The alignment forces are proportional to the square of the rotation speed. Also, when the hologon unit is not turning, it can experience a shock load when the apparatus is struck or moved. This shock load can cause the hologon disc unit to misalign from its self-alignment position. If the hologon unit sits at this misaligned position for a long period of time, the bearing assembly can take a set which causes the hologon disc and its bearing assembly to stick in the misaligned orientation which is difficult to unstick.

It has been proposed to glue the hologon bearing assembly in order to lock it in position. Gluing is undesirable since the entire assembly becomes unusable because its orientation cannot be reset, as is required, since it changes overtime during operation of the apparatus. Moreover, locking of the hologon disc into its self-alignment position by putting glue into the bearing of the dynamic mount (FIG. 2) and letting it set up after the unit has rotated into its self-alignment position has been found to be impractical, since the glue tends to be spun out of the hologon disc by centrifugal force before the glue sets up and locks the bearing in the self-alignment position.

Accordingly, it is the principal object of the present invention to improve hologon scanner apparatus by providing an improved mounting for retaining a hologon disc unit on a drive shaft wherein the difficulties and disadvantages of prior fixed, hard mounts and dynamic mounts are eliminated while maintaining the benefits thereof.

SUMMARY

It is a further object of the prevent invention to provide an improved adjustable mount for a hologon deflector which is readily resettable to reorient the deflector in a position where it is perpendicular to the rotational axis of its drive shaft.

It is a still further object of the present invention to provide an improved fixed mount for a hologon deflector which can easily be removed so as to enable access to the drive motor for bearing exchange and other maintenance purposes.

Briefly described, a mount for retaining a hologon disc unit on a drive shaft embodying the invention utilizes connecting means for the unit which connects the same to the shaft in fixed rotational angular position with respect to the rotational axis thereof. The connecting means includes means for adjustably positioning the unit in fixed, perpendicular angular orientation relative to the rotational axis of the shaft. The connecting means is implemented in accordance with the preferred embodiment of the invention by a spherical bearing which enables free pivotal motion of the disc unit and a retainer having adjustment members which project therefrom to different distances and bear against the disc unit so as to fix the disc unit in perpendicular angular orientation to the rotational axis of the shaft.

The foregoing and other objects, features and advantages of the invention as well as a presently preferred embodiment thereof will become more apparent from a reading of the following description in connection with the accompanying drawings in which:

DETAILED DESCRIPTION

Figure 3:
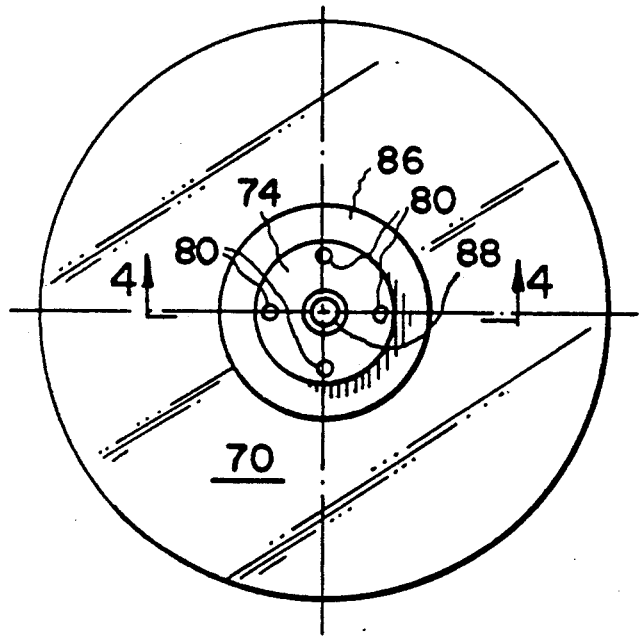
FIG. 3 is a plan view and FIG. 4 is a view generally in section along the diametral line 4—4 in FIG. 3 showing a hologon deflector assembly having an adjustable fixed mount in accordance with the invention.
Figure 4:
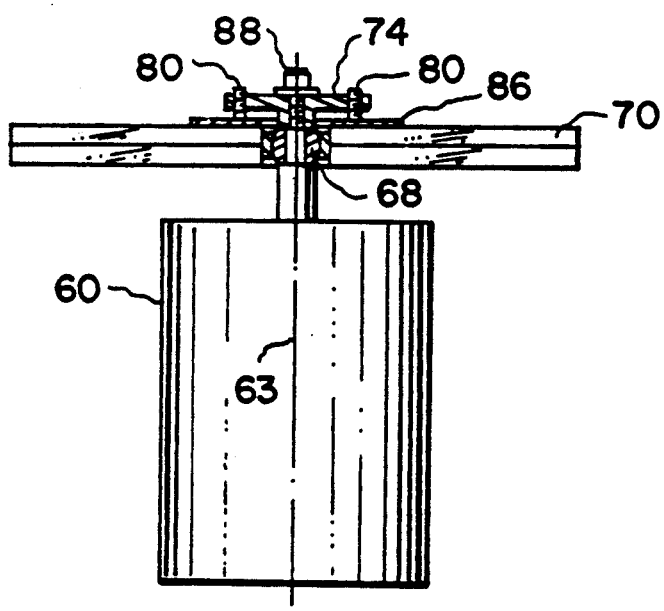
Figure 5:
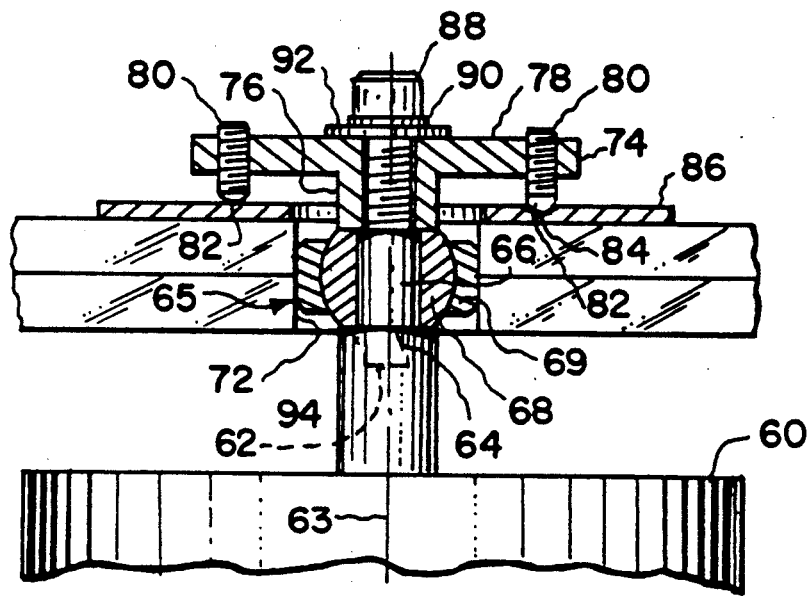
FIG. 5 is a fragmentary sectional view of the mount shown in FIGS. 3 and 4 which is enlarged.

Referring to FIGS. 3, 4 and 5, there is shown a motor 60 having a rotor shaft 62 which is stepped at 64 to form a reduced diameter end 66 on which a spherical bearing 68 may be press fit or keyed. A raceway 69 in which the bearing 68 is free to pivot about a plane perpendicular to the rotational axis 63, provides part of a hub assembly 65 of the hologon disc unit 70 to which it is connected in a center hole or opening 72 thereof. The raceway 69 thus provides an outer bearing member while the spherical bearing 68 provides an inner bearing member which connects the hologon disc unit 70 to the shaft 62. The connection is also provided by a retainer cap 74 having a cylindrical post 76 and a disc forming a flange 78 from which four adjusting screw members 80 project towards the disc unit 70. The angular displacement of these adjusting screws 80 may alternatively be 120° apart rather than 90° apart as shown in the drawing. Then only three adjusting screw members 80 are needed.

The adjusting screws are spaced radially from the axis 63 and have tips 82, at least one of which enters an indentation 84 in a balancing disc 86. The disc 86 is fixed to the hologon disc 70 by adhesive material and is suitably made of soft metal (malleable material) such as lead or brass. Material is removed from the disc to achieve balance required for the hologon assembly. Brass is presently preferred. The dimple indentation 84 may be replaced by a radial groove indentation. The indentation 84 provides a securing point in that when the adjusting screw 80 is inserted into it, the rotational angular position of the hologon disc 70 is locked to the rotational position of the retainer cap 74. The cap 74 in turn holds the spherical bearing 68 onto the rotor shaft 62 since the bottom of the post 76 clamps against flats on the top and bottom of the spherical bearing 68 between the bottom of the post 76 and the step 64 thereby tightly clamping the inner bearing member (the spherical bearing 68) and fixing it and the retainer cap in rotational angular position relative to the rotor shaft 62. Clamping forces are applied by a locking screw 88 having a shoulder 90 and/or washer 92 which is screwed into a threaded hole 94 coaxial with the rotational axis 63 and bored and tapped into the shaft 62.

With the retainer cap 74 and the hologon disc unit 70 locked on the motor shaft 62, the adjusting screws 80, which are threaded in the retainer cap 74, are used to change the perpendicular angular orientation of the hologon disc relative to the motor rotation axis 63. This change or alignment in orientation is performed while the hologon disc is not rotating, i.e., the motor 60 is not running. Proper alignment can be judged by rotating the disc unit 70 by hand and observing the change in the disc wobble by means of a dial indicator which measures the up and down swing of the disc edge as it is rotated. Another procedure for evaluating the alignment of the hologon relative to the motor rotational axis (to the plane perpendicular to that axis) is to shine a laser beam on the hologon disc and observe the motion of the reflected spot from the disc at a known distance as the disc is rotated by the motor. A third alternative method of determining the setting of the adjusting screws 80 is to measure the fixed cross-scan beam error and/or the fixed in-scan beam jitter error and set the adjusting screws to minimize the fixed cross-scan and/or fixed in-scan beam displacement error between scans produced by individual facets on the hologon disc.

Using precision screws for the adjusting screws 80 orientation of the hologon disc 70 to within about 5 to 10 arc seconds of being perpendicular to the rotation axis 63 (an alignment position with respect to a plane perpendicular to the axis 63) is obtainable using any of the methods discussed above. Even after many hours of operation, including many starts and stops of the motor, this hologon alignment position and corresponding deflector wobble angle is maintained. It may be desirable to lock the adjusting screws 80 in position with a screw locking compound such as "LOC-TITE". It may be desirable to fill the gap between the bottom surface of the retainer cap 74 and the top surface of the balancing disc 86 with a potting compound such as RTV silicon.

The embodiments shown in FIGS. 6, 7, 8, 9 and 10 to the extent that they are similar to the embodiment of the invention shown in FIGS. 3-5 are identified with like reference numerals. The embodiments of FIGS. 6, 7, 8 and 9 provide alternative means for locking the rotational angular orientation of the hologon disc 70 to that of the motor shaft 62.

Figure 6:
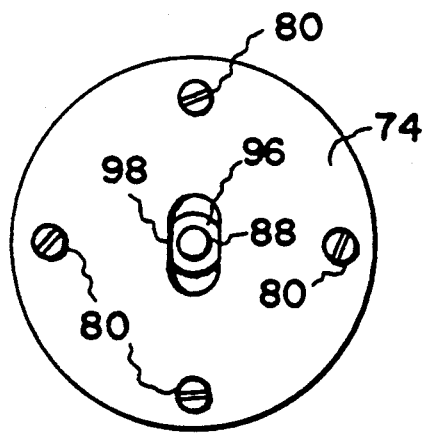
FIGS. 6 and 7 are respectively top and sectional views of a hologon deflector having an adjustable fixed mount in accordance with another embodiment of the invention.
Figure 7:
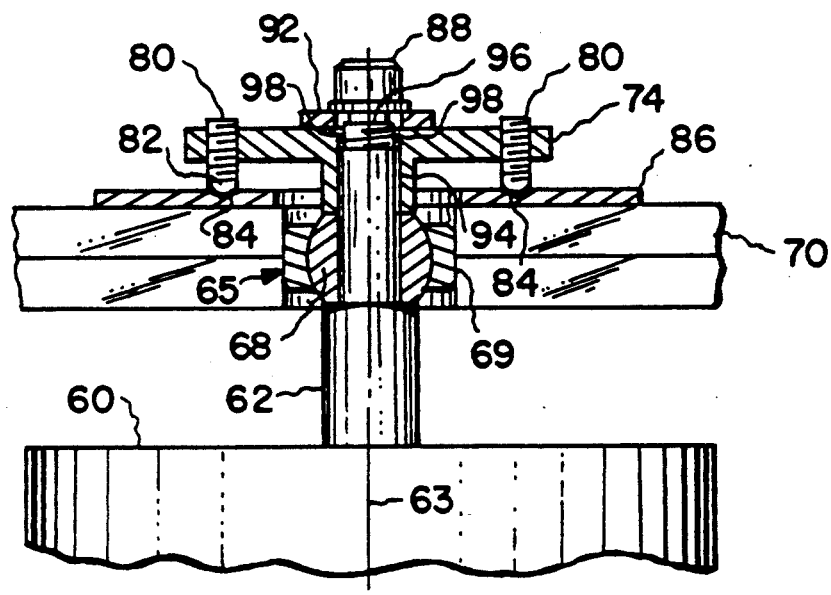

Referring to FIGS. 6 and 7, the rotor shaft 62 reduced diameter end portion 94 is lengthened compared to the end portion 66 shown in FIG. 5, so that it extends up through the retainer cap 78. The upper end 96 is machined with two flat parallel surfaces 98. These flat surfaces can extend along the axis 63 towards the motor 60, suitably about ⅛ inch. These surfaces 98 function as a male key locking member that mates to a corresponding female key locking member provided by the sides of a slot 100 in the retainer 78. This slot and the retaining adjusting screws 80, the tips of which enter indentations (dimples) 84 in the balancing disc 86 insures that the rotational angular orientation between the hologon disc and the motor rotor shaft 62 remains fixed and further insure that the alignment of the hologon disc 70 perpendicular to the rotation axis also remains essentially constant with both time and cycling on and off of the motor.

Figure 8:
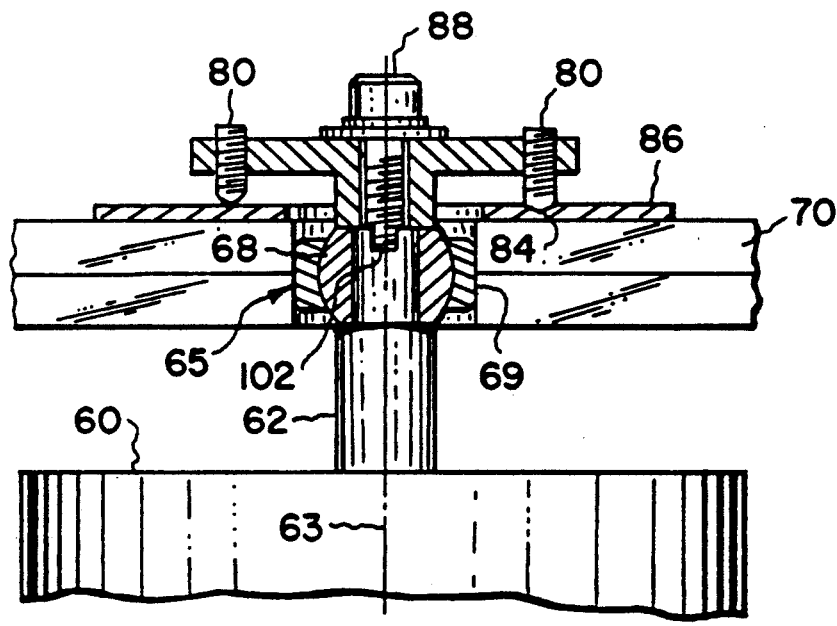
FIG. 8 is an enlarged sectional view similar to FIG. 5 showing a hologon deflector having an adjustable fixed mount in accordance with still another embodiment of the invention.

Referring to FIG. 8, another locking mechanism is provided by a female drive slot 102 in the top of the reduced diameter portion 66 of the rotor shaft 62. A corresponding mating male driving rib or blade extends from the bottom of the retainer cap (but is not shown in FIG. 8 because the section is through a central diametral plane). This driving rib or blade extends from the bottom of the retainer cap into the drive slot 102.

Figure 1:
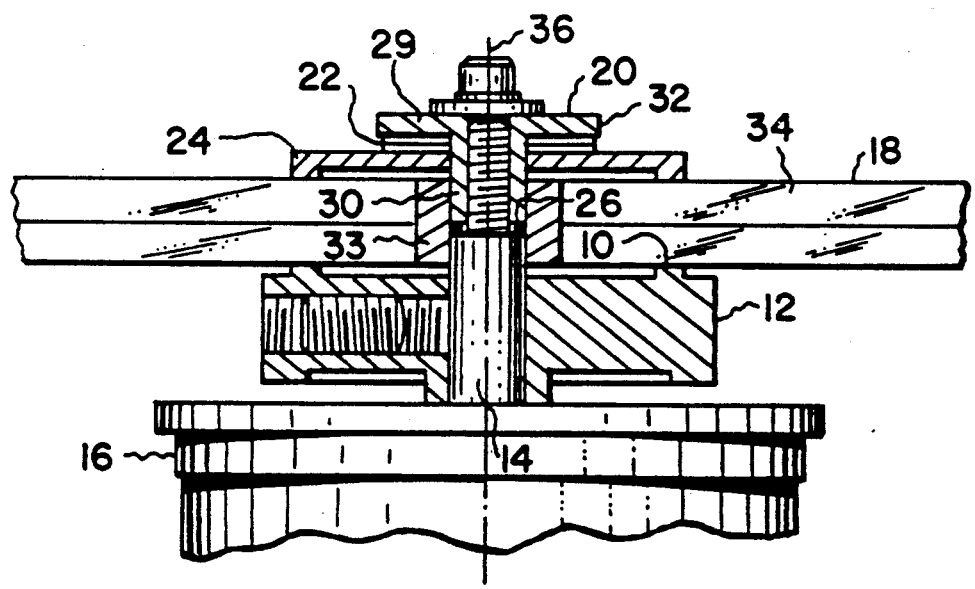
FIG. 1 is a sectional view along the plane through a diameter of a hologon deflector assembly having a fixed, hard mount in accordance with the prior art.
Figure 2:
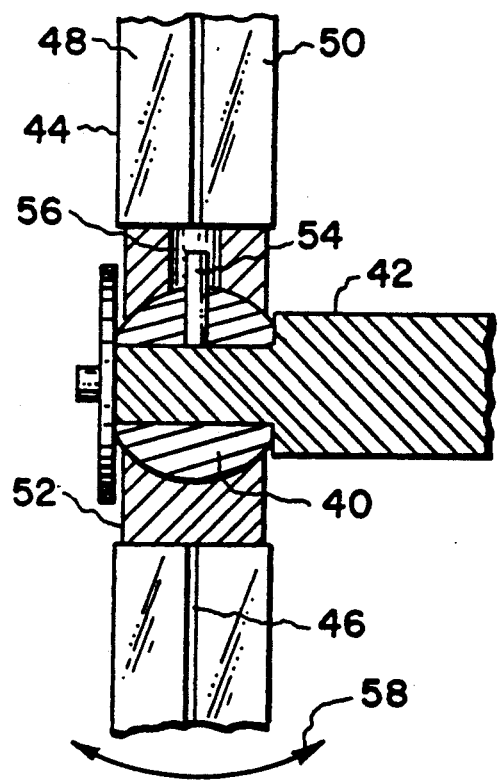
FIG. 2 is a sectional view of a hologon having a dynamic mount in accordance with the prior art.
Figure 9:
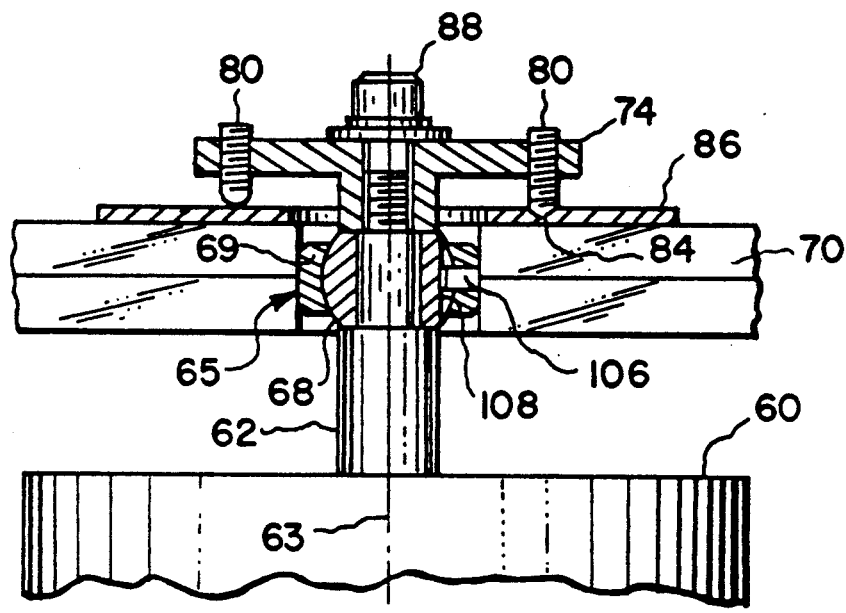
FIG. 9 is an enlarged sectional view similar to FIG. 5 of a hologon deflector incorporating an adjustable fixed mount in accordance with still another embodiment of the invention.

In FIG. 9, a drive pin 106 enters into a slot 108 extending in the bearing 68 in the direction of the axis 63. This locking arrangement is similar to the arrangement to the drive pin 54 shown in FIG. 2. In FIG. 9 the perpendicular angular orientation for alignment of the hologon disc 70 is obtained using the adjusting screws as discussed above.

Figure 10:
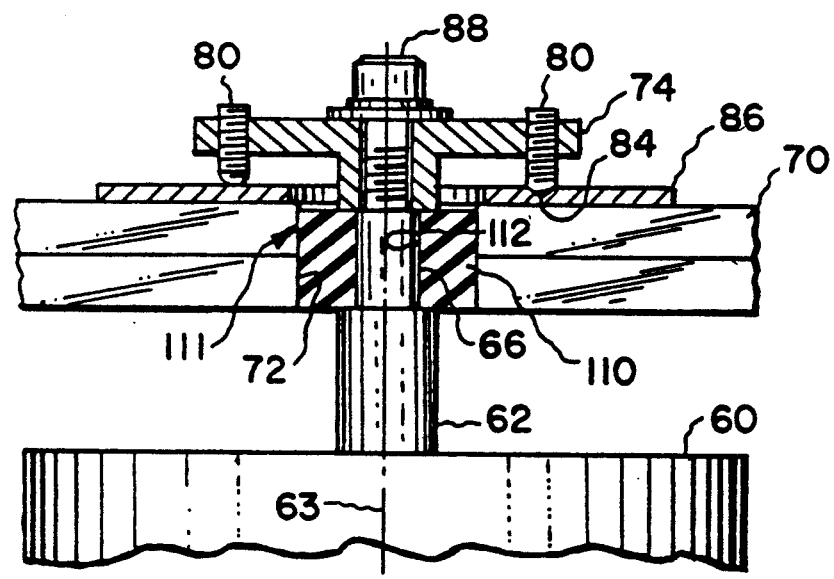
FIG. 10 is a sectional view similar to FIG. 5 showing a hologon deflector having an adjustable fixed mount in accordance with still another embodiment of the invention.

In FIG. 10, the spherical bearing is replaced by a flexible elastomer material body such as a rubber bushing 110. The adjusting screws 80 exert force sufficient to align the hologon disc unit 70 since they exert more force than the restoring force in directions along the axis 63 which arise upon deflection of the bushing 110. The bushing 110 is connected along its outer periphery to the inner periphery of the central opening 72 of the hologon disc and provides a part of the hub assembly therefor. The rubber bushing is connected, suitably by adhesive to the inner periphery of the opening 72, and can, by similar means, be connected to the reduced diameter part 66 of the shaft 62. Alternatively, the bushing can be molded in place using, for example, a semicircular center hole having a flat surface in the hole 112 therethrough, through which the reduced diameter section 66 of the shaft 62 extends.

From the foregoing description it will be apparent that there has been provided improved hologon scanner apparatus having an adjustable, fixed mount for a hologon which retains the features of dynamic mounts and fixed mounts of the type heretofore proposed, but not the disadvantages thereof. Moreover, the improved mount provides more accurate alignment and lower wobble angle than dynamic or fixed mounts over a wider range of rotational speeds of the hologon unit. Variations and modifications in the hereindescribed embodiments of the invention, within the scope of the invention, will undoubtedly suggest themselves to those skilled in the art. Accordingly, the foregoing description should be taken as illustrative and not in a limiting sense.

I claim:

1. A mount for retailing a hologon disc unit having a central opening on a drive shaft having a rotational axis which comprises means connecting said unit to said shaft in fixed rotational angular position therewith, which comprises a hub having a rotational axis coincident with the rotational axis of said shaft, said hub being disposed in said opening of said unit, a spherical bearing connected to and rotatable with said shaft in said hub permitting angular movement of sad unit about a plane perpendicular to said rotational axis, and means included in said connecting means for retaining said unit on said shaft, said retaining means including alignment means spaced from said rotational axis and extending to said disc unit for changing said perpendicular angular orientation thereof, and wherein said fixed rotational angular position is obtained by said hub having a raceway having an outer periphery connected to said disc unit and an inner periphery providing a bearing surface for said spherical bearing, said bearing having a slot therein extending generally parallel to said rotational axis, and a drive pin extending from said raceway into said slot in said bearing to enable rotation of said bearing about said plane perpendicular to said rotational axis.

2. A mount for retaining a hologon disc unit having a central opening on a drive shaft having a rotational axis which comprises means connecting said unit to said shaft in fixed rotational angular position therewith, which comprises a hub having a rotational axis coincident with the rotational axis of said shaft, said hub being disposed in said opening of said unit, means in said hub permitting angular movement of said unit about a plane perpendicular to said rotational axis, means included in said connecting means for retaining said unit on said shaft, said retaining means including alignment means spaced from said rotational axis and extending to said disc unit for changing said perpendicular angular orientation thereof, and said means in said hub permitting said angular movement about the plane perpendicular to said rotational axis being a body of elastomer material flexible about said plane perpendicular to said rotational axis.

3. A mount for retaining a hologon disc unit having a central opening on a drive shaft having a rotational axis which comprises means connecting said unit to said shaft in fixed rotational angular position therewith, which comprises a hub having a rotational axis coincident with the rotational axis of said shaft, said hub being disposed in said opening of said unit, means in said hub permitting angular movement of said unit about a plane perpendicular to said rotational axis, means included in said connecting means for retaining said unit on said shaft, said retaining means including alignment means spaced from said rotational axis and extending to said disc unit for changing said perpendicular angular orientation thereof, and said retaining means further comprising a cap attached in fixed nonrotating relationship to said shaft and extending radially from said rotational axis, said alignment means further comprising a plurality of members extending in the direction of said rotational axis into contact with said unit and angularly spaced from each other about said rotational axis and attached to said cap in independently movable relationship for tilting said unit to any angular position with respect to said plane perpendicular to said rotational axis to set said unit in fixed position substantially, exactly perpendicular to said rotational axis thereby substantially eliminating wobble of said unit about said perpendicular plane as said unit rotates.

4. The mount according to claim 3 wherein said disc unit has a disc of malleable material on one side thereof facing said cap, at least one of said alignment members extending into said malleable material disc.

5. The mount according to claim 3 wherein said alignment members are adjustment screws threadedly connected to said cap and having tips contacting said disc unit.

6. The mount according to claim 5 wherein said disc unit has a disc of malleable material attached thereto and disposed about said rotational axis with the surface thereof facing said cap, said malleable material disc having at least one indentation in said surface opposite to said screws which receives the tip of at least one of said screws.

7. The mount according to claim 3 wherein said retaining means further comprises a locking screw extending to said cap and hub into said shaft, said locking screw having a shoulder clamping said cap and said hub to said shaft for a rotation therewith while in said fixed rotational angular position.

8. The mount according to claim 3 further comprising means for keying said shaft and cap in fixed angular relationship thereby fixing the rotational angular position of said disc unit on said shaft.

9. The mount according to claim 8 wherein said keying means comprises an opening in said cap having an inner periphery through which said shaft extends and presents a surface to said periphery, said periphery and said surface of said shaft having flats in contacting relationship.

10. The mount according to claim 8 wherein said keying means is provided by a slot disposed in an end of said shaft on which said cap is disposed, and a rib extending from said cap into said slot and engaging said shaft.

* * * * *